Patented Oct. 15, 1935

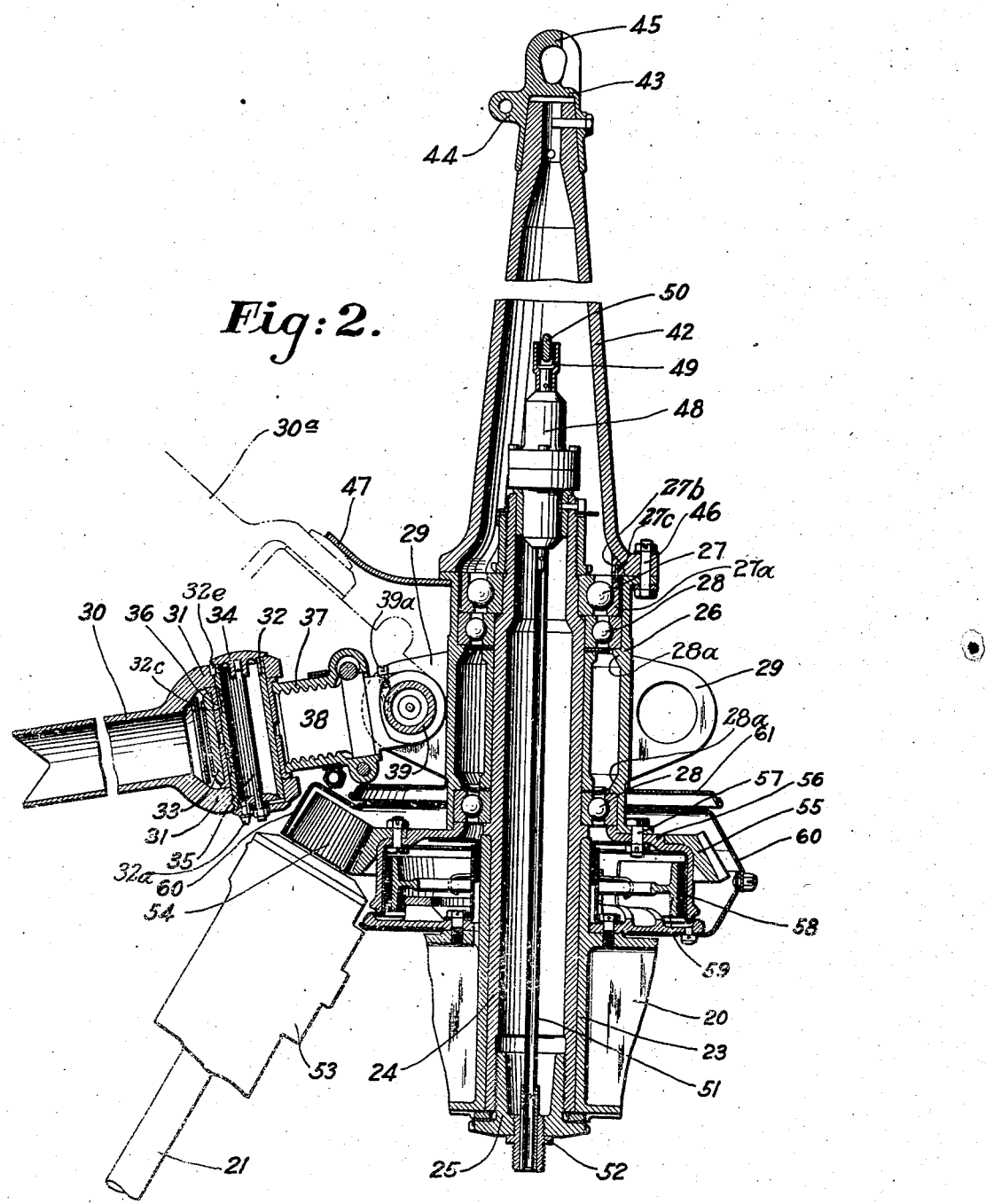
Fig:2.

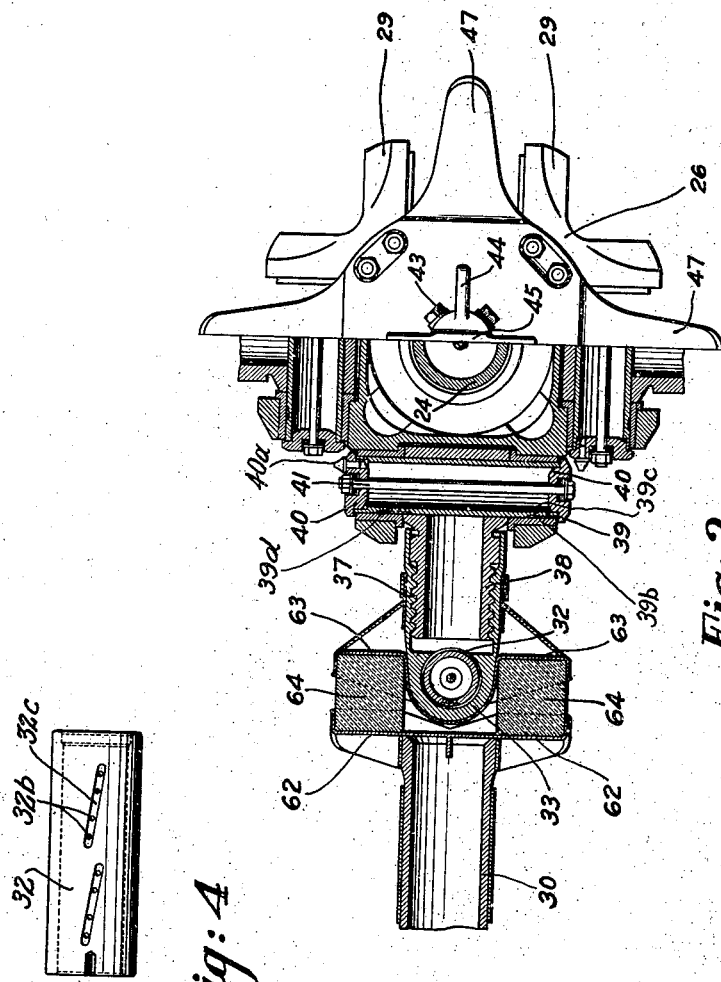

2,017,105

UNITED STATES PATENT OFFICE 2,017,105

AIRCRAFT HAVING SUSTAINING ROTORS

Joseph S. Pecker, Philadelphia, and Agnew E. Larsen, Huntingdon Valley, Pa., assignors to Autogiro Company of America, Philadelphia, Pa., a corporation of Delaware Application August 31, 1931, Serial No. 560,314

3 Claims. (Cl. 244—19)

This invention relates to aircraft having sustaining rotors and is more especially concerned with the rotor hub or head structure.

Among the more important objects of the invention are simplification of parts employed and reduction of weight as well as of head resistance or parasite drag. In addition, this invention has in view simplification of the structure for the purposes of inspection, lubrication or repair and, still further, accomplishing all of the foregoing objects while increasing the general strength of the head.

The present invention also contemplates other more or less specific objects and advantages some of which are mentioned just below.

The arrangement of parts herein disclosed provides improved distribution of thrusts and stresses to which the various bearings of the head and associated parts are subjected. For example, the main rotor head bearings, i. e., those which are disposed between the stationary and rotatable hub parts, are arranged in such manner as to reduce bearing loads as well as to decrease the general overall diameter of the hub structure. The manner in which this is accomplished will be more apparent from the following description. In addition, the bearings for the pivoted or articulated joints between the individual blades and the hub structure are spaced and disposed in such manner as to efficiently distribute the loads. This arrangement is further advantageous since it permits the reduction of size and weight of at least certain of the bearing parts without decreasing the strength thereof.

Another object of considerable importance is involved in a novel type of lubrication employed for the individual blade articulations. The articulation pins, in accordance with this invention, are made of hollow construction in order to serve as grease reservoirs and the pins, together with their cooperating pivot parts, are so constructed that the grease or other lubricant may be fed under the action of centrifugal force from the interior thereof to their outer bearing surfaces in the high pressure zones or areas. These high pressure zones, of course, are created by virtue of rotation of the system about the central axis and the invention, therefore, provides for efficient and automatic feed of the lubricant to the points where it is most needed.

As a further object, the invention makes provision for convenient handling of aircraft sustaining rotors as well as of craft, as a whole, which are equipped with sustaining rotors. This is accomplished by the use of a "slinging" lug associated with the rotor head and arranged so that the rotor itself or the entire ship may be handled or moved from place to place by a crane, or other like structure, engaging the lug. In addition to convenience afforded in handling the rotor itself for purposes of inspection, lubrication or the like, the fact that the entire ship may be supported and moved from place to place by means of this lug materially facilitates handling thereof, for example, on an aircraft carrier such as employed in naval operations.

The invention also contemplates a more compact rotor brake unit than has been employed heretofore, this unit including a cast metal drum part having a steel lining whereby great strength is afforded and, at the same time, the life of the parts is materially increased.

Still further, this invention has in view the use of a casing or protecting housing for portions of the rotor head including the brake mechanism and also rotor driving parts such as those employed for purposes of starting or initiating rotation of the rotor blades. In this way, parasite drag and the like may be still further reduced and the structure further serves to prevent ingress of water, dirt or the like to the brake and starter parts. It is also of advantage to employ the protecting housing herein disclosed since the danger of injury to the parts enclosed or to other parts coming in contact therewith is reduced to a minimum.

A further object of the invention resides in the use of a novel type of tachometer drive mechanism, the said mechanism materially simplifying the installation and also affording convenience for the purpose of takedown and reassembly of rotor head parts.

As an additional object, this invention has in view a novel arrangement of axis structure including a hub member having means for the attachment of the sustaining blades thereto and a strengthening rib or shoulder formed on the hub adjacent to the blade attachment means. This shoulder, in the preferred arrangement, is also disposed adjacent to the main rotor bearings and, indeed, may be employed to position one of the bearing races, with the result that the structure, in general, is considerably strengthened and also provides for substantially direct transmission of thrust to and through the bearings as well as around the hub member proper at a point of maximum strength.

How the foregoing objects and advantages, together with others which will occur to those skilled in the art, are obtained, will be more apparent from a consideration of the following description making reference to the accompanying drawings, in which—

Figure 2 is a vertical sectional view of a rotor head or hub structure, including a number of associated parts, the view being substantially enlarged over the showing of Figure 1;

Figure 3 is a view partly in horizontal section and partly in top plan of portions of the structure illustrated in Figure 2; and Figure 4 is an elevational view of a pivot member for a blade articulation.

Figure 1:
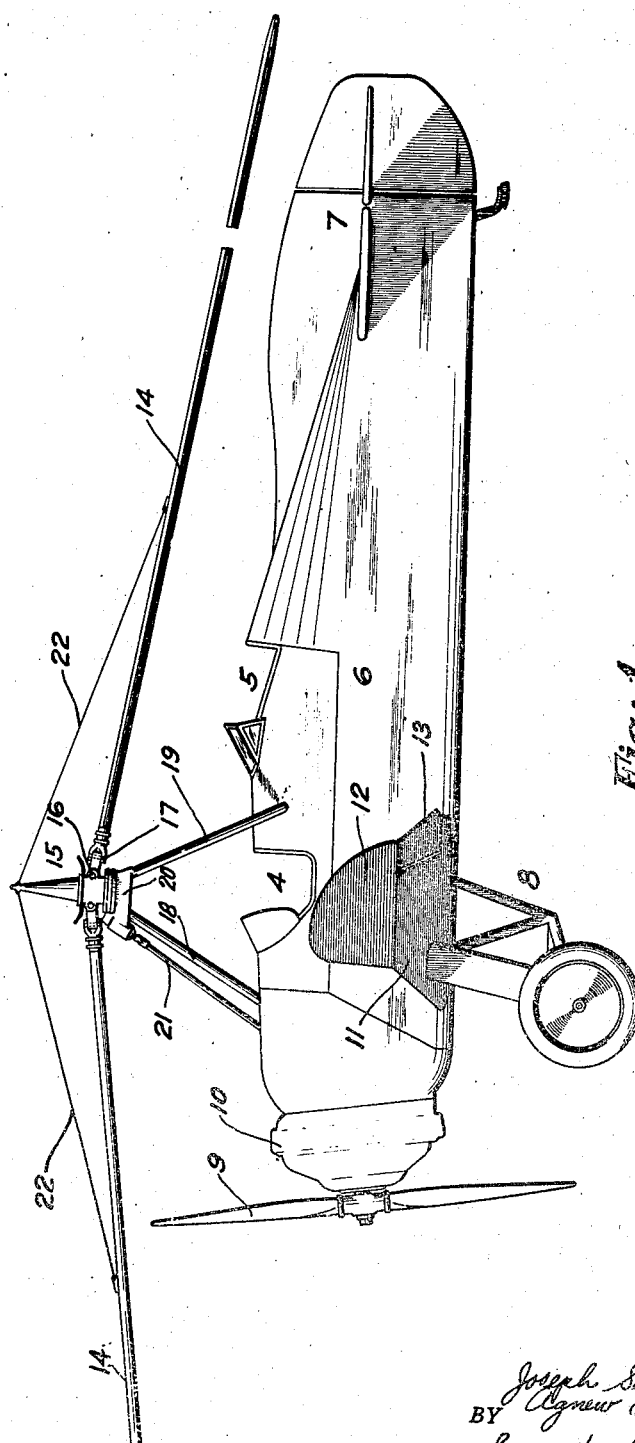
Figure 1 is a somewhat diagrammatic side elevational view of a craft of the type to which the present invention relates, this craft being equipped with a rotor head structure constructed in accordance with the present invention.

Before considering the hub structure proper, attention is called to the fact that in Figure 1 we have illustrated a craft having a pair of cockpits 4—5 in the fuselage 6 thereof. The craft is further equipped with an empennage structure 7 and landing gear 8. At the forward end a propeller 9, driven by the engine indicated diagrammatically at 10, is provided, this propeller and engine serving as the forward propulsion means for the craft. Supplemental fixed wings 11 having upturned tips 12 are disposed at the sides of the body 6, the former carrying aileron control surfaces 13.

The primary sustension means of the craft takes the form of a rotor or system of rotatively mounted blades or wings, two of these being indicated by the reference numeral 14. The blades are mounted on a central hub or axis mechanism generally indicated at 15, the mounting for each blade including a substantially horizontally disposed pivot 16 and a substantially vertically disposed pivot 17. These pivots permit the blades to assume positions of equilibrium between inertia, lift and other flight forces during operation.

The rotor system is disposed above the body of the craft and mounted on a plurality of post or leg elements 18 and 19 which extend upwardly from the fuselage 6 to be interconnected in an apex or strengthening structure 20.

In order to support the blades when they are inactive or rotating at relatively low speeds, suspension cables or wires 22 may be employed, such cables being attached, at their inner ends, to an upwardly extended portion of the rotor head 15, so that, when at rest, the blades are supported in a somewhat "drooped" position substantially as illustrated in Figure 1.

The craft may also be equipped with a mechanism for driving or initiating rotation of the rotor system. In Figure 1, we have illustrated a portion of such a mechanism as including a shaft 21 which may be clutched to the engine 10 and which is extended upwardly adjacent to the rotor hub at which point gears or the like may be employed for the transmission of torque from the shaft 21 to the rotor hub 15, the structure employed for this purpose being more clearly illustrated in Figures 2 and 3 described herebelow.

Referring to Figures 2 and 3, attention is first called to the fragmentary showing (in Figure 2) of the supporting or pylon apex structure 20. Here it will be seen that the structure 20 is provided with a socket 23 adapted to receive the fixed or stationary part 24 of the axis mechanism. At its lower end, the part 24 is threaded to receive the flanged nut structure 25 which serves, through its flange, to transmit the thrust of sustension from the part 24 to the lower side of the apex structure 20. These parts provide for removal of the entire rotor or rotor system, as a unit, by the mere removal of the structure 25. It should be noted, however, that an arrangement of parts providing for this unitary removal is not a part of the present invention per se, but is described and claimed in the copending application, Serial No. 529,576, filed April 13th, 1931, of Agnew E. Larsen, assignor to the assignee of this application, said application having issued November 27, 1934 as Patent No. 1,982,113.

The spindle part 24 is extended upwardly from the mounting structure 20 to provide an axis about which the hub member proper 26 may rotate. The parts 24 and 26 are spaced somewhat from each other to provide a cavity in which lubricant, preferably grease, may be packed and also to accommodate the bearings 27, 28—28.

The bearings 28—28 are arranged to take the radial load and preferably have at least their outer races positioned by means of internal circumferential shoulders 28a formed on the hub member 26. These shoulders serve to considerably strengthen the hub structure in general and provide for efficient transmission of the radial load to the radial bearings.

The bearing indicated at 27 is designed to transmit the thrust of sustension of the craft from the hub member 26 to the central spindle 24 and, in order that this bearing shall be subjected to thrust load only, its outer race 27a is of slightly smaller diameter than the inside diameter of the hub member 26. This arrangement is of considerable advantage since the imposition of radial loads on a thrust bearing of the type here involved, would decrease the thrust load to which the bearing could safely be subjected.

A still further safety feature is involved in the use of a pin 27c mounted in a lug 27b formed internally of the rotor tip or cone 42. This pin is arranged to project into a suitable bore or recess formed in the outer bearing race 27a of the thrust bearing 27 and thus serves to insure proper positioning of the thrust bearing during initial assembly or replacement of the bearing after inspection. If the bearing is inserted in inverted position, the cone, of course, will not seat properly and the workman will thus be advised of improper assembly.

With respect to the various main rotor head bearings 27 and 28—28, it is noted that the various races and their positioning members are so arranged that, in the event of jamming of the bearing balls, the races may still turn with respect to either or both of the two primary axis members (24 and 26). This, of course, is highly important, as a safety feature, since, for successful flight operation, the rotor system must always be free to rotate under the influence of flight wind.

For purposes of attaching the blades to the hub, the member 26 carries pairs of opposed and apertured lugs 29 which, in the embodiment shown, are disposed in such manner that the lugs of opposite pairs are arranged substantially in alignment with each other and substantially tangentially to the hub structure 26. In this way, tension stresses due to the action of centrifugal force are carried substantially directly through and across the hub structure. These stresses, therefore, need not be carried through curved or cornered walls, with the result that adequate strength may be provided with parts of minimum weight. While this particular feature is not a part of the present invention per se, it is mentioned herein in order to more fully clarify certain other novel cooperative relations of parts. Certain features of the arrangement just referred to are described and claimed in the copending application, Serial No. 547,295 of Agnew E. Larsen, filed June 27th, 1931, issued April 30, 1935, as Patent No. 1,999,840.

The arrangement of the blade attaching lugs 29, furthermore, is such that at least a portion thereof overlies or comes adjacent to the internal hub reenforcements 28a—28a. In addition to direct transmission of thrust, tangentially of the hub structure, between diametrically opposed blades, the arrangement of the lugs adjacent to the reenforcements 28a—28a provides for still greater general strength as well as efficient and substantially direct transmission of load to the main rotor bearings 27 and 28—28.

The structure employed for the attachment of the blades to the hub will be apparent from inspection of the parts at the left-hand side of Figures 2 and 3. A portion of the blade structure in each of these views is indicated at 30 as being provided with a forked end 31—31, each portion of the fork being apertured to receive the pivot member 32. The parts 31—31 embrace an additional joint part 33 which is also apertured to receive the pin or pivot part 32. These parts are those which are embodied or incorporated in the pivot structure indicated generally and somewhat diagrammatically at 17 in Figure 1.

In accordance with this invention the pivot member 32 is fixedly mounted within the fork 31—31, cap members 34—34, tiebolt 35 and pin 32e being provided for this purpose. The movement of this joint, therefore, takes place between the member 33 and the pivot 32 and, if desired, bearing bushings 36 may be interposed between these relatively movable joint parts.

By constructing the joint 31, 32, and 33 in the manner just described, the load imposed upon the bearing may be distributed over relatively extensive bearing surfaces. This is advantageous, of course, in reducing wear as well as in permitting reduction in the width and weight of the fork parts.

Another feature of considerable importance in connection with the blade articulation just described, is involved in the arrangement of the pivot pin 32 as a lubricant reservoir. This reservoir is of such capacity as to contain a charge of grease sufficient to lubricate the bearing surfaces associated with the pin 32 from the time of one general rotor inspection to another. A convenient fitting, in the nature of a one-way valve 32a, may be disposed in one of the cap members 34, so that the reservoir may readily be charged by the application of a pressure gun. The lubricant is fed from the interior of the pin 32 to the bearing surfaces at the outer cylindrical wall of this pin through ducts 32b and grooves 32c (see Fig. 4). As seen in this figure, as well as in Figure 2, the grooves 32c are extended within the high pressure area incident to the action of centrifugal force during rotation of the rotor. In addition, the distributing grooves are preferably extended about the pin 32 throughout an arc equal to that defined by the limits of blade swinging movements under the influence of normal irregularities in flight forces. In this way, the zone or area of highest pressure is always supplied with lubricant. It is further to be observed that the arrangement of the pin 32 and the immediately cooperating members is such that lubricant will be fed from the reservoir, to the high pressure area, under the influence of centrifugal force.

In order to provide for control of certain blade movements about the vertically disposed pivots 32, the blade end 30 and the joint part 37, for each blade, may conveniently be provided with opposed bracket members 62 and 63 at each side of the axis of this joint. In this way, provision is made for the insertion of resilient blocks 64, preferably made of rubber, which are preferably under compression and yieldingly resist relative angular movement of the blade end 30 and the joint part 37.

The part 33 is extended inwardly toward the hub and has a cylindrical portion 37 which is internally threaded to cooperate with an externally threaded member 38. The members 37 and 38, therefore, may be employed as a means of adjustment of the incidence of the individual blades, the action of such an arrangement being more fully described and illustrated in the copending application, Serial No. 567,343 of Joseph S. Pecker, filed October 7th, 1931, issued March 26th, 1935, as Patent No. 1,995,460.

Toward its inner end, the member 38 is provided with a transverse aperture through which the pivot 39 is extended. This member 39 serves to pivotally connect a blade with a pair of apertured lugs 29—29 of the hub 26 and the parts may be retained in their proper operative positions by means of cap members 40—40, tiebolt 41 and the set screw 39a. As will be aparent from comparison of Figures 1, 2, and 3, the joint structure 38, 39 and 29—29 serves to pivot a blade to the hub structure on a substantially horizontally extended axis as diagrammatically indicated at 16 in Figure 1.

Similarly to the pin 32, the pin 39 is also formed as a reservoir for grease which may be fed through ducts or passages 39c and grooves 39d to the bearing surfaces between the bushings 39b and the outer surface of the pin 39. A pressure gun fitting 40a may also be provided in one of the cap members 40. The set screw 39a serves to fixedly position the pin 39 with respect to the joint part 38, so that the grease grooves 39d will be retained in the high pressure zone.

Above the hub member 26, the rotor head is provided with a cone or tip 42 which serves, among other things, as a mounting for the device 43. This device has apertured lugs 44 to which the blade suspension cables may be attached and, in addition, is provided with a slinging lug 45 by means of which the entire craft or the rotor proper may be lifted, handled, and moved from place to place. The tip 42, of course, is securely fastened to the hub 26 as by means of bolts 46 and, since the center of gravity of the rotor as well as of the craft as a whole are both disposed generally vertically below the rotor hub, the rotor or the craft may be supported in a substantially level position from the slinging lug. The hub structure may also be provided with resilient parts 47 extended outwardly from the axis to overlie the root ends of the blades. These members 47 may thus serve to yieldingly cushion abnormal movements of the blades as by gusts of wind when the rotor is idle and the ship is on the ground. A blade root in an abnormally upwardly angled position is indicated in dot and dash lines in Figure 2 at 30a and, from this showing, it will be seen that the members 47 are positioned to cooperate with a cap 34 of the vertical pivot. The full line showing of the blade root and the articulations in Figure 2 illustrates the lower limit of movement on the horizontal pin 39. From this showing it will be apparent that the various parts underlying the blade root as well as various elements of the blade root itself are so arranged as to provide for relatively great upward and downward swinging movement, although it will be understood that, in normal flight operation, the extension of the blade will be slightly above the horizontal.

In order to obtain more accurate readings of the speed of rotation of the rotor, we preferably employ a "booster" or speed increase mechanism 48 interposed in the driving connection between a tachometer, which may conveniently be located in a cockpit of the craft, and the rotor itself. The rotor tip 42 serves to house the "booster", this mechanism being supported at the upper end of the spindle 24 and being provided with an upwardly extended driving connection 49 which is forked to engage the internal element 50 of the cone 42. The structure 48, of course, is maintained stationary by virtue of its support in association with the spindle 24 and, upon rotation of the rotor system, the driving connection 49—50 serves to transmit rotor movements, through the mechanism 48, to the downwardly extended tachometer shaft 51. This shaft or connection 51 is journalled for rotation within the fitting 52 which may suitably be screwed into the attaching nut device 25 at the lower end of the spindle 24. From this point, any suitable flexible or other operating connection may be extended to an instrument in a cockpit of the craft in a manner which will be understood by those skilled in the art. It should be observed, before proceeding further, that the tachometer driving mechanism cooperates with a movable part of the rotor (the cone 42) in such manner that separation of the parts is facilitated for purposes of lubrication, inspection and the like.

In addition, it is observed that the tachometer driving connection does not interfere with removal of the entire rotor, as a unit, since the nut device 25 and the fitting 52 may be displaced with respect to the shaft 51. Any suitable and readily detachable slip-joint or the like may be associated with the lower end of the shaft 51 and the flexible connection which may be extended to a cockpit of the craft.

The rotor starter shaft 21 (see Figures 1 and 2) may be suitably journalled within a bearing housing or the like 53 mounted in association with the supporting apex structure 20 and, at the upper end of this shaft (21), a pinion 54 is arranged to engage a cooperating ring gear 55. The gear 55, in turn, is carried by the drum structure 56 which, in its turn, is attached to the hub part 26 as by means of bolts 57.

With respect to the arrangement of the blade pivots and the starter gearing adjacent the hub, attention is called to the fact that the relative positions and spacing of these parts is such that a portion of the gearing is disposed adjacent the path of rotative movement of the blades at a point between their spaced pivots. This is of advantage since all the parts involved may be arranged more compactly and still provide ample clearance for blade swinging movements.

According to this invention the drum 56 is preferably made in the form of a light metallic casting in order to simplify manufacture and reduce the weight and, at its inner surface, it is provided with a steel lining 58 against which a rotor brake mechanism 59 may react. The brake mechanism need not be considered in detail herein as structures of this general character are not a part of the present invention per se, but only in combination with other features herein disclosed. Various features of a brake mechanism of the internal expanding type are described and claimed in the copending application, Serial No. 545,451, filed June 19th, 1931, of Joseph S. Pecker, assignor to the assignee of this application, issued April 30, 1935, as Patent No. 1,999,737.

According to this invention various rotor starter parts, including the gears 54 and 55 and, additionally, the entire brake unit, are enclosed within a housing or casing 60, this housing, as will be apparent from inspection of Figure 2, including a portion which is extended angularly at the forward side of the hub to enclose the pinion 54. The casing 60 is further apertured at its upper side to pass the hub member 26 and the hub member is preferably provided with an annular baffle plate 61 which overlies a portion of the casing 60 and thus prevents ingress of moisture, dirt or the like. Effective protection of these parts from rain or the like, is, therefore, provided and, at the same time, parasite drag is reduced to a minimum.

The structure above described is advantageous, in general, since all the various parts, (including the main rotor bearings, the blade pivot lugs and pivot joints, the brake parts and associated rotor driving mechanism), are all relatively arranged so as to produce a much more compact rotor head structure than obtained heretofore. This, of course, reduces parasite drag, head resistance and skin friction to a minimum, and, it should be observed that, in addition to the foregoing, very great strength is provided even though the parts, for a machine of given size, are relatively small and light in weight.

Still further, the relatively wide spacing of the blade attaching lugs 29 permits relatively light construction thereof, since by increasing the resisting moment arm the strains and thrusts of operation (especially during blade swinging movements) which are transmitted to the hub, are materially reduced. The arrangement of the strengthening shoulders 28a—28a adjacent to the blade attaching lugs as well as to the radial bearings 28—28 is also of importance in obtaining maximum strength with a minimum of weight in the parts employed.

The relatively wide spacing of the main rotor bearings (i. e., those which are disposed between the spindle 24 and the hub 26) is also of advantage since it provides for mounting of the blade attaching lugs relatively close to the axis of the rotor head. This is important because it reduces the general overall diameter of the head, and places the horizontal articulations close to the center of the head, whereby certain basic purposes of the hinge joints, to wit: the elimination of gyroscopic action and bending moments, are enhanced. Furthermore, the wide spacing of the bearings reduces the bearing loads imposed by the action of a couple due to unsymmetrical thrust of the rotor, drag, etc.

Various of the individual blade pivot joints, furthermore, are also arranged advantageously to distribute bearing loads over relatively large bearing surfaces. The size and weight of these parts, therefore, may also be reduced in a structure adapted for use in connection with a craft of given size.

A novel and highly desirable type of lubrication for the blade articulations is also provided, it being particularly advantageous in permitting convenient renewal of the lubricant at the periodic times of rotor head inspection and lubrication. The lubrication arrangement is also of advantage as it provides for automatic feed, under the action of centrifugal force, to the high pressure areas of both the horizontal as well as the vertical pins.

The entire head is also arranged so that maximum convenience is afforded for purposes of inspection, lubrication, repair or the like, it being noted particularly that separation of various of the parts is provided for without materially dismantling the rotor unit. For example, the rotor tip 42 may be removed in order to repack the lubricant cavity without interfering with the tachometer driving mechanism. Also, the rotor as a whole may be displaced and conveniently handled, by means of the slinging lug 45, by the mere displacement or detachment of the nut device 25.

Finally, the general appearance of the rotor head is considerably enhanced, it being noted in this connection that the various parts are compact and of small overall dimensions and are also well covered to present a neat external appearance.

Attention is directed to the fact that certain features of the blade articulation and associated mechanism are not claimed herein, per se, but are described and claimed in our co-pending application Serial Number 724,470, filed May 8th, 1934.

What we claim is:—

1. In an aircraft having a sustaining rotor, rotor axis mechanism, a rotor blade pivotally connected with the axis mechanism on at least two spaced pivots, and rotor driving means including gearing mounted adjacent the axis mechanism, at least a portion of said gearing being disposed adjacent the path of rotative movement of said blade in a plane generally perpendicular to the longitudinal axis of the blade and passing between its spaced pivots.

2. In an aircraft having a sustaining rotor, rotor axis mechanism, a rotor blade pivotally connected with the axis mechanism on substantially horizontally and substantially vertically extended pivots, the pivots being spaced from each other with the horizontal pivot disposed between the vertical pivot and the rotor axis, and rotor driving means including gearing mounted adjacent the axis mechanism, at least a portion of said gearing being disposed adjacent the path of rotative movement of said blade in a plane generally perpendicular to the longitudinal axis of the blade and passing between its spaced pivots.

3. An aircraft having a rotative sustaining wing system including at least a pair of relatively rotatable hub or axis members one of which is connected with the body of the craft and the other of which is connected with the sustaining wings for rotation therewith, a thrust bearing interposed between said relatively rotatable members and adapted to transmit the thrust of sustension from the sustaining wings to the body of the craft, and means for handling the craft associated with the hub member which is rotatable with the sustaining wings, whereby when handling the craft the weight thereof is transmitted to the handling means through said bearing.

JOSEPH S. PECKER.
AGNEW E. LARSEN.